GraphicUS010630707B1

United States Patent
Oren (10) Patent No.: US 10,630,707 B1
(45) Date of Patent: Apr. 21, 2020

(54) METHODS, SYSTEMS, AND MEDIA FOR DETECTING FRAUDULENT ACTIVITY BASED ON HARDWARE EVENTS

(71) Applicant: Integral Ad Science, Inc., New York, NY (US)

(72) Inventor: Yossef Oren, New York, NY (US)

(73) Assignee: Integral Ad Science, Inc., New York, NY (US)

(*) Notice: Subject to any disclaimer, the term of this patent is extended or adjusted under 35 U.S.C. 154(b) by 154 days.

(21) Appl. No.: 15/338,739

(22) Filed: Oct. 31, 2016

Related U.S. Application Data (60) Provisional application No. 62/248,126, filed on Oct. 29, 2015.

(51) Int. Cl.
H04L 29/06 (2006.01)

(52) U.S. Cl.
CPC ...... H04L 63/1425 (2013.01); H04L 63/1416 (2013.01)

(58) Field of Classification Search
CPC .................. H04L 63/1408; G06F 21/6245
See application file for complete search history.

(56) References Cited

U.S. PATENT DOCUMENTS

| | | | | |
|---|---|---|---|---|
| 7,657,626 B1* | 2/2010 | Zwicky | .................. | G06Q 30/02 705/51 |
| 7,917,491 B1* | 3/2011 | Sack | ...................... | G06Q 30/02 707/708 |
| 9,565,205 B1* | 2/2017 | Fleyder | ............... | H04L 63/1441 |
| 2006/0136294 A1* | 6/2006 | Linden | ............... | G06Q 30/0257 705/14.47 |
| 2008/0162202 A1* | 7/2008 | Khanna | .................. | G06Q 20/10 705/14.47 |
| 2008/0301090 A1* | 12/2008 | Sadagopan | ....... | G06F 17/30867 |
| 2011/0113388 A1* | 5/2011 | Eisen | ...................... | G06F 21/32 715/856 |
| 2013/0226692 A1* | 8/2013 | Kouladjie | ............... | G06Q 30/02 705/14.45 |
| 2014/0115662 A1* | 4/2014 | Johnson | ................ | G06F 21/316 726/2 |
| 2014/0325645 A1* | 10/2014 | Turgeman | ........... | H04L 63/1408 726/22 |

(Continued)

Primary Examiner — Baotran N To
(74) Attorney, Agent, or Firm — Byrne Poh LLP (57) ABSTRACT

Mechanisms for detecting fraudulent activity based on hardware events are provided. In accordance with some embodiments of the disclosed subject matter, the method comprises: receiving a request for advertising content to be placed on a website; receiving data describing physical activity at one or more user input hardware devices; receiving data describing interactions with the website; correlating the data describing interactions with the website with the data describing physical activity at one or more user input hardware devices; determining whether at least a portion of the interactions with the website are indicative of fraudulent behavior based on the correlation; and responding to the request for advertising content on the website by inhibiting the advertising content to be transmitted to the website in response to the determination that at least a portion of the interactions with the website indicates fraudulent behavior.

18 Claims, 4 Drawing Sheets

(56) References Cited

U.S. PATENT DOCUMENTS

| | | | |
|---|---|---|---|
| 2015/0032533 A1* | 1/2015 | Raab | G06Q 30/0248 |
| | | | 705/14.47 |
| 2016/0080405 A1* | 3/2016 | Schler | H04L 63/1425 |
| | | | 726/23 |
| 2017/0032412 A1* | 2/2017 | Scharber | G06F 16/24573 |

* cited by examiner

METHODS, SYSTEMS, AND MEDIA FOR DETECTING FRAUDULENT ACTIVITY BASED ON HARDWARE EVENTS

CROSS-REFERENCE TO RELATED APPLICATIONS

This application claims the benefit of U.S. Provisional Patent Application No. 62/248,126, filed Oct. 29, 2015, which is hereby incorporated by reference herein in its entirety.

TECHNICAL FIELD

The disclosed subject matter relates to detecting fraudulent activity based on hardware events. More particularly, the disclosed subject matter relates to detecting a bot or other application executing one or more operations that simulate human activity.

BACKGROUND

Online advertisements are created with the goal of having the advertisements viewed, listened to, or otherwise received by a target audience. The target audience may be, for example, one or more users with a set of particular interests or one or more users falling into a particular demographic or psychographic group. However, distributing such advertisements to the desired audience is a difficult process. It is often difficult for brand managers, ad networks, publishers, advertisers, and/or advertising agencies (collectively referred to herein as "advertisers") to control and manage the service of their advertisements.

For example, online advertisements allow the publishers of well-viewed websites to derive a profit from their web traffic. To do this, these website publishers can place an advertisement tag on their webpages, which causes the webpage to load additional content that is delivered by an advertisement network. Such an advertisement tag includes an advertisement as well as code that records or otherwise detects the viewer's interaction with a particular webpage. In return, the website publisher can be compensated by the advertisement network as viewers view the advertisement and/or interact with the advertisement.

There is therefore a need in the art for approaches for controlling and managing the distribution of advertisements for publication on websites. For example, advertisers are concerned with managing the distribution of their advertisements for publication on websites that are engaging in suspicious activity, such as bot fraud, click fraud, advertisement impression fraud, or other deceptive behavior. In a more particular example, to perform bot fraud, these website publishers create a webpage that is capable of hosting advertisements and then run an application that simulates human interaction with this webpage by simulating viewing and/or clicking on an online advertisement presented on the webpage. As the advertisement network compensates the website publisher as it records interaction with the webpage, this allows the website publisher to receive compensation even though no human user has viewed the advertisement. By using a cloud computing environment or by infecting devices with malicious code, such a bot fraud application can be run on many devices at the same time. Bot fraud and other fraudulent advertisement activity diverts advertising money from legitimate website publishers, thereby reducing the effectiveness of online advertisements and their budgets.

Although various approaches attempt to counter click or bot fraud, such approaches remain ineffective as programmers of bot fraud applications are generally capable of writing programs which generate mouse traces and perform other operations that are very similar to those generated by human users.

Accordingly, it is desirable to provide methods, systems, and media that overcome these and other deficiencies in the prior art.

SUMMARY

In accordance with some embodiments of the disclosed subject matter, mechanisms for detecting fraudulent activity in connection with advertisements based on hardware events are provided.

In accordance with some embodiments of the disclosed subject matter, a method for detecting fraudulent activity on a website is provided, the method comprising: receiving a request for advertising content to be placed on a website; receiving data describing physical activity at one or more user input hardware devices; receiving data describing interactions with the website; correlating the data describing interactions with the website with the data describing physical activity at one or more user input hardware devices; determining whether at least a portion of the interactions with the website are indicative of fraudulent behavior based on the correlation; and responding to the request for advertising content on the website by inhibiting the advertising content to be transmitted to the website in response to the determination that at least a portion of the interactions with the website indicates fraudulent behavior.

In accordance with some embodiments of the disclosed subject matter, a system for detecting fraudulent activity on a website is provided, the system comprising: a hardware processor that is configured to: receive a request for advertising content to be placed on a website; receive data describing physical activity at one or more user input hardware devices; receive data describing interactions with the website; correlate the data describing interactions with the website with the data describing physical activity at one or more user input hardware devices; determine whether at least a portion of the interactions with the website are indicative of fraudulent behavior based on the correlation; and respond to the request for advertising content on the website by inhibiting the advertising content to be transmitted to the website in response to the determination that at least a portion of the interactions with the web site indicates fraudulent behavior.

In accordance with some embodiments of the disclosed subject matter, a non-transitory computer-readable medium containing computer executable instructions that, when executed by a processor, cause the processor to perform a method for detecting fraudulent activity on a website is provided, the method comprising: receiving a request for advertising content to be placed on a website; receiving data describing physical activity at one or more user input hardware devices; receiving data describing interactions with the website; correlating the data describing interactions with the website with the data describing physical activity at one or more user input hardware devices; determining whether at least a portion of the interactions with the website are indicative of fraudulent behavior based on the correlation; and responding to the request for advertising content on the website by inhibiting the advertising content to be transmitted to the website in response to the determination that at least a portion of the interactions with the website indicates fraudulent behavior.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments of the disclosed subject matter, mechanisms (which can include methods, systems, and media) for detecting fraudulent activity in connection with advertisements based on hardware events are provided. These mechanisms can be used in a variety of applications. For example, these mechanisms can be used to detect whether a website is engaging in click fraud. Click fraud (also known as "bot fraud") generally relates to the imitation of a legitimate user of a web browser application clicking on or selecting an advertisement such that a payment for the selection is made without having an actual interest in the advertisement and/or with the objective of depleting advertising budgets.

In some embodiments, the mechanisms described herein can receive information corresponding to activities performed on a website and can determine whether the one or more activities are indicative of bot fraud. For example, the mechanisms described herein can detect hardware events that include user input hardware activity on a user device being used to access a website (e.g., activities corresponding to a user physically moving a mouse or touching a trackpad) and also detect website interactions (e.g., the movement and selections of a cursor on the website). In such an example, the mechanisms can then correlate the user input hardware activity with the detected website interactions (e.g., by determining whether each website interaction matches with a related user input hardware activity). To continue the example, if a certain proportion of website interactions does not correlate with user input hardware activity (e.g., a threshold percentage, a threshold number of interactions, etc.), the mechanisms described herein can determine that the user device is likely to be engaging in click fraud. Otherwise, if a larger proportion of website interactions does correlate with user input hardware activity, the mechanisms can determine that the user device is being operated by a human, and is not likely to be engaging in click fraud.

In some embodiments, the mechanisms described herein can, without further user input, create advertisement tags that can be used to implement the fraudulent activity detection. For example, such advertising tags can then be used when advertisements are placed with a publisher such that the fraudulent activity detection techniques are implemented for that advertisement.

It should be noted that, although the embodiments described herein generally refer to click or bot fraud and the use of bots or other applications for simulating human user activity, this is merely illustrative. These mechanisms can be used to detect whether a website is engaging in any suitable suspicious activity or deceptive behavior, such as advertisement impression fraud. For example, with regard to advertisement impression fraud in which bots or other applications repeatedly load a page or an advertisement, these mechanisms can determine whether a webpage is engaged in fraudulent activity based on correlation between interaction with the webpage and hardware events. This can be done with respect to interaction with a webpage and not with an advertisement, for example, as the user may be viewing the advertisement passively and may not be interacting with the advertisement.

The mechanisms described herein can be used with any suitable advertising management techniques. For example, the mechanisms described herein can be used with passive advertising management techniques, such as monitoring techniques which can be used to monitor a web page in which the advertisement placement appears and/or to monitor other advertisement placements on the web page. As another example, the mechanisms described herein can be used with active advertising management techniques, such as techniques for preventing an advertisement from being presented when click fraud is detected on the web page on which the advertisement is to be presented. Examples of advertising management techniques are disclosed in Luttrell et al. U.S. Pat. No. 8,595,072 and Freedman et al. U.S. patent application Ser. No. 13/749,472, each of which is incorporated by reference herein in its entirety.

Figure 1:
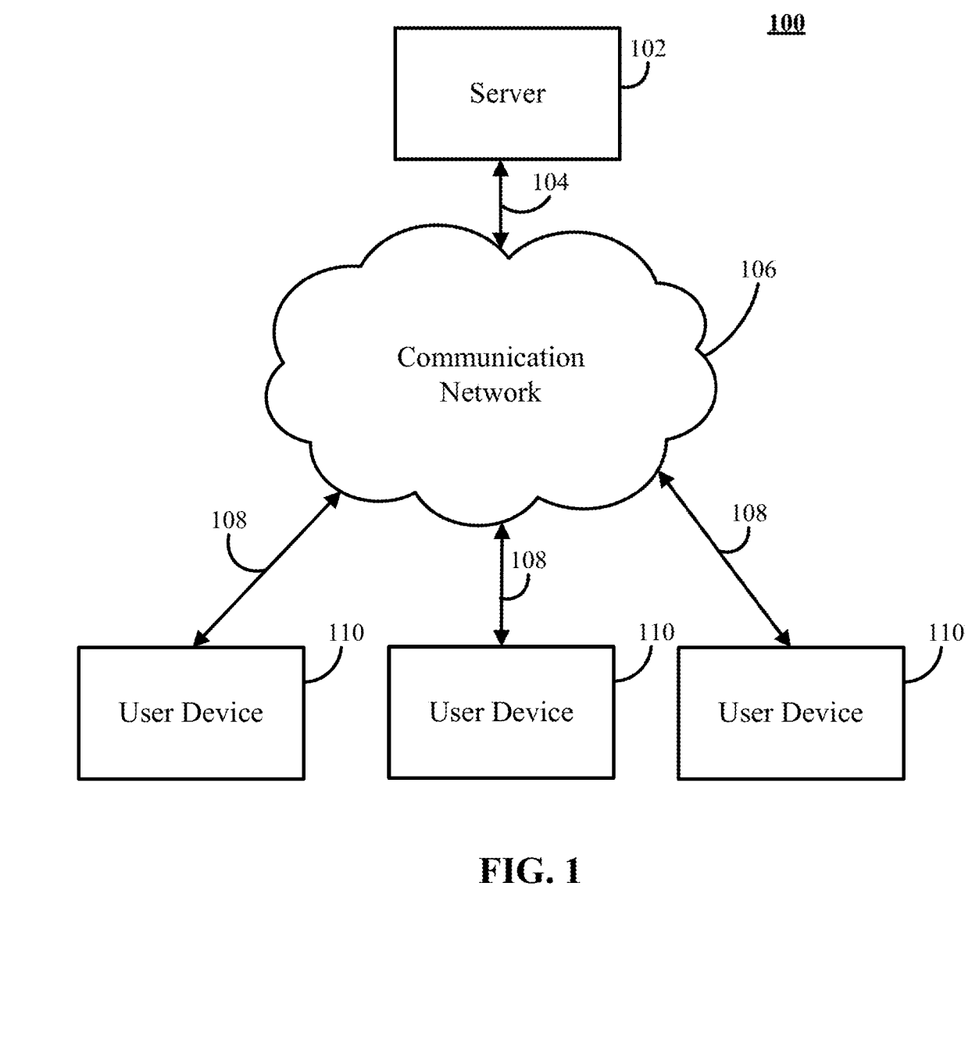
FIG. 1 shows an example of a generalized schematic diagram of a system on which the mechanisms for detecting fraudulent activity in connection with advertisements based on hardware events as described herein can be implemented in accordance with some embodiments of the disclosed subject matter.

FIG. 1 shows an example 100 of a generalized schematic diagram of a system on which the mechanisms for detecting fraudulent activity in connection with advertisements based on hardware events as described herein can be implemented in accordance with some embodiments of the disclosed subject matter. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Server 102 can be any suitable server or servers for providing access to the mechanisms described herein for detecting fraudulent activity in connection with advertisements based on hardware events, such as a processor, a computer, a data processing device, or any suitable combination of such devices. For example, the mechanisms for detecting fraudulent activity in connection with advertisements based on hardware events can be distributed into multiple backend components and multiple frontend components and/or user interfaces. In a more particular example, backend components, such as mechanisms for receiving information related to one or more advertising placements, parsing the information related to one or more advertising placements, receiving and analyzing hardware event information from a hardware event detector on a client device, determining whether hardware event information is indicative of fraudulent activity on a webpage, etc., can be performed on one or more servers 102. In another more particular example, frontend components, such as presentation of a user interface for placing code configured to detect hardware events on a given webpage, initiating the mechanisms for detecting fraudulent activity in connection with advertisements, receiving user input to detecting fraudulent activity in advertisements, etc., can be performed on one or more user devices 110.

In some embodiments, each of user devices 110, and server 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 110 can be implemented as a personal computer, a laptop computer, a smartphone, a tablet computer, a mobile telephone, a wearable computer, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110 and server 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for detecting fraudulent activity in connection with advertisements based on hardware events.

Figure 2:
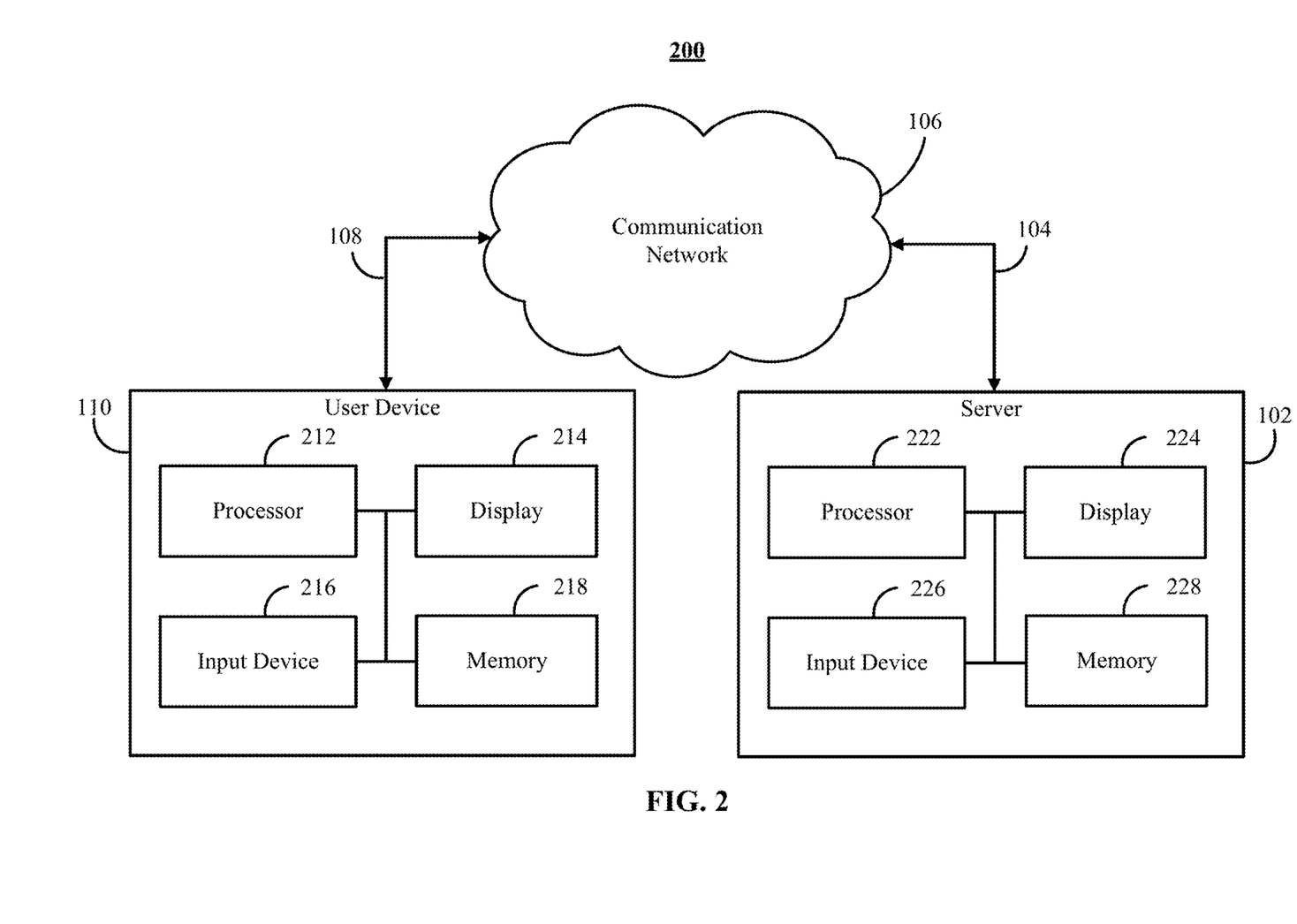
FIG. 2 shows an example of hardware that can be used to implement one of a computing device and a server depicted in FIG. 1 in accordance with some embodiments of the disclosed subject matter.

FIG. 2 shows an example 200 of hardware that can be used to implement one or more of user devices 110, and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute the mechanisms described herein for downloading and/or saving information about hardware events and/or mouse events, uploading and/or transmitting the information about advertisement placements to server 102, presenting a user interface for specifying one or more advertising management techniques for the advertisement placements associated with the information about the advertisement placements, causing selections of advertising management techniques to be saved, communicating the specified advertising management techniques to an advertising platform that is used to place advertisements in the advertising placements, sending and receiving data through communications link 108, and/or for performing any other suitable task associated with the mechanisms described herein. In some embodiments, hardware processor 212 can send and receive data through communications link 108 or any other communication links using, for example, a transmitter, a receiver, a transmitter/receiver, a transceiver, or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, and/or any other suitable input device.

Server 102 can include a hardware processor 222, a display 224, an input device 226, and memory 228, which can be interconnected. In some embodiments, memory 228 can include a storage device (such as a non-transitory computer-readable medium) for storing data received through communications link 104 or through other links. The storage device can further include a server program for controlling hardware processor 222. In some embodiments, memory 228 can include information stored as a result of user activity (e.g., user instructions to specify one or more advertising management techniques for particular advertising placements, etc.), and hardware processor 222 can receive information about advertising placements from user devices 110, (e.g., as described below in connection with process 300 of FIG. 3). In some embodiments, the server program can cause hardware processor 222 to, for example, execute one or more portions of process 300 as described below in connection with FIG. 3.

Hardware processor 222 can use the server program to communicate with user devices 110 as well as provide access to and/or copies of the mechanisms described herein. It should also be noted that data received through communications link 104 or any other communications links can be received from any suitable source. In some embodiments, hardware processor 222 can send and receive data through communications link 104 or any other communications links using, for example, a transmitter, a receiver, a transmitter/receiver, a transceiver, or any other suitable communication device. In some embodiments, hardware processor 222 can receive commands and/or values transmitted by one or more user devices 110 and/or one or more users of server 102, such as a user that makes changes to adjust settings associated with the mechanisms described herein for providing video content suitable for audio-only playback. Display 224 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, and/or any other suitable input device.

In some embodiments, server 102 can be implemented in one server or can be distributed as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be implemented to perform different tasks associated with the mechanisms described herein.

Figure 3:
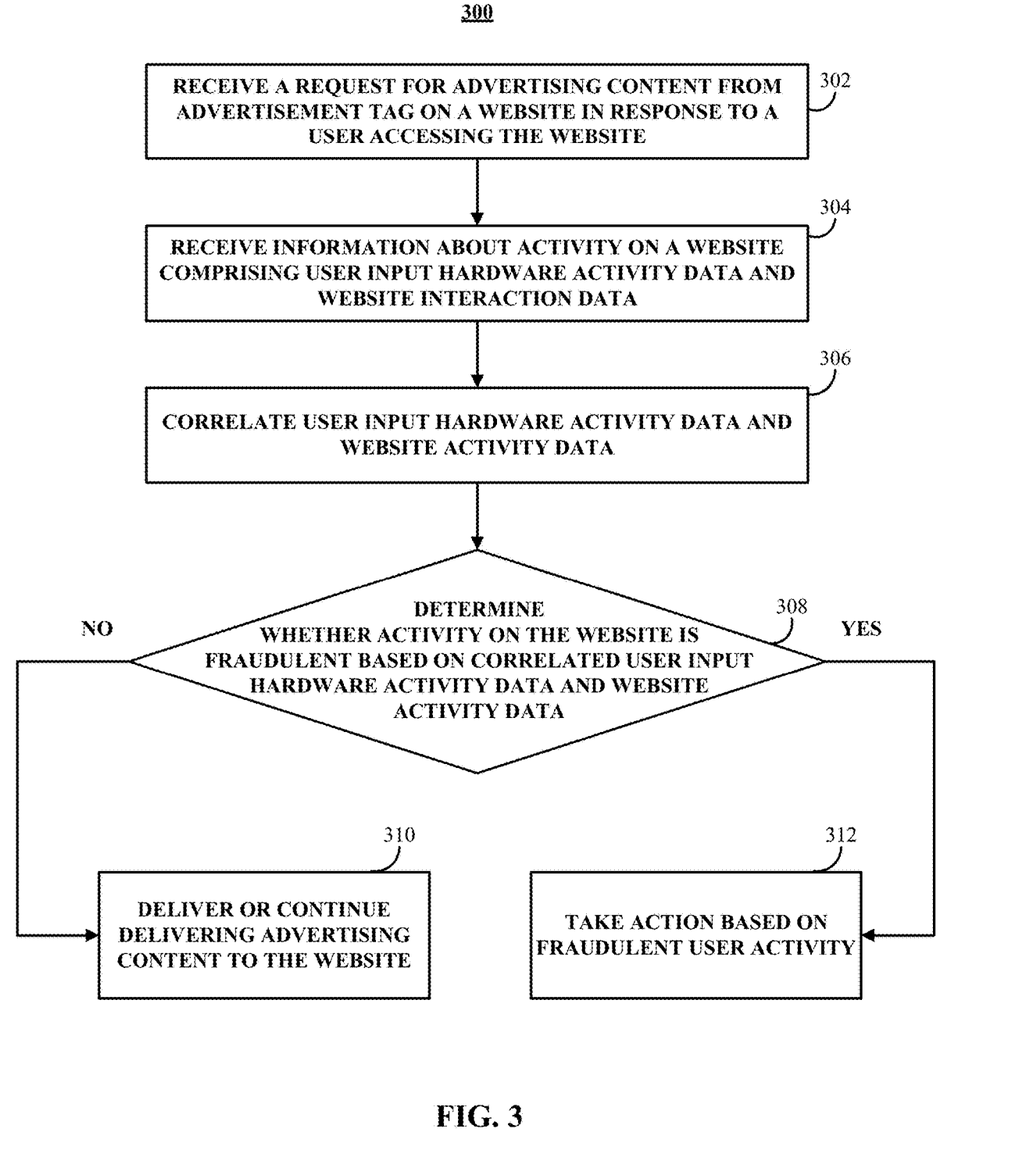
FIGS. 3, 4A, and 4B show illustrative examples of a process for detecting fraudulent activity in connection with advertisements based on hardware events in accordance with some embodiments of the disclosed subject matter.

Turning to FIG. 3, an example 300 of a process for detecting fraudulent activity in connection with advertisements and other content based on hardware events is shown.

At 302, process 300 can begin by receiving a request for advertising content from an advertisement tag on a website. In some embodiments, this request can be received by any suitable device or combination of devices. For example, turning back to FIG. 1, the request can be received by server 102, or by a user device 110. As another example, the request can be received by an advertiser's server device (e.g., a server that provides advertising content). As yet another example, the request can be received by a third party server device (e.g., an intermediary server that handles a request for advertising content by redirecting the request for advertising content).

In some embodiments, the request can include any suitable information. For example, in some embodiments, the request can include information for selecting an advertisement. In a more particular example, the request can include information about the website, about the size of an area on the website for the advertisement, about the computing device from which the request originated, and/or any other suitable information. In another more particular example, in connection with the use of an intermediary server, the request can be supplemented with additional information relating to the device transmitting the request, a user account associated with the device, webpage information, publisher information, historical information, prior fraud activity information, etc.

At 304, process 300 can receive information about one or more activities performed on a website. Such information can include user input hardware activity data and website interaction data.

In some embodiments, the user input hardware activity data can be data describing the activity of any suitable user input hardware on a user device or a server device. For example, turning to FIG. 2, the user input hardware activity data can describe the activity of one or more input devices 216 or 226. As a more particular example, the one or more input devices can be one or more of a computer keyboard, a computer mouse, a touchpad, a voice recognition circuit, a touchscreen, a stylus pointing device, and/or any other suitable input device.

In some embodiments the user input hardware activity data can include any suitable form of data describing user input hardware activity. For example, the user input hardware activity data can include times at which the activity occurred. As a more particular example, if the user input hardware includes a mouse or other suitable pointer device, the data can include the times at which the mouse has been moved by a user. In continuing this example, the user input hardware activity data can include a navigational trace or mouse event trace of each mouse movement within a given time period (e.g., a browsing session from the time a browsing application was opened to the current time that the request was received). As another more particular example, if the user input hardware includes a keyboard, the data can include the times at which a key on the computer keyboard has been pressed by a user. As another example of user input hardware activity data, the data can include the content of the user input. As a more particular example, if the user input hardware is a mouse, the data can include the relative position or relative movement of the mouse. As another more particular example, if the user input hardware is a keyboard, the data can include the character represented by the key pressed by the user.

In some embodiments, the website interaction data can include any data concerning interaction with a website. For example, the data can include the locations of movement of a cursor across the website, entries into text fields on the website, interactions with a web browser, characters entered while viewing the website, or any other suitable form of interaction. As another example, the data can include the times that each of the interactions of the previous example occurred.

In some embodiments, the user input hardware activity data can be received from any source. For example, the user input hardware activity data can be received from a user device. As a more particular example, the user input hardware activity data can be sent by the user device in response to instructions from an ad tag on the website. As another more particular example, the user input hardware activity data can be sent by the user device in response to instructions from a web browser being used to access a website. As yet another more particular example, the user input hardware activity data can be stored in a cookie file, and sent by a web browser upon accessing a website. As another example, the user input hardware activity data can be received from a server hosting a website. As a more particular example, in response to a web browser accessing a web site on a user device, the server hosting the website can request the user input hardware activity data from the web browser, or from the user device, and relay the user input hardware activity data.

In some embodiments, the user input hardware activity data can be gathered in any suitable fashion. For example, the user input hardware activity data can be gathered by a web browser. In a more particular example, a module on the web browser can detect user input hardware activity at the microarchitecture level. As another example, the user input hardware activity data can be gathered by an application installed directly on a user device. As a more particular example, the application can detect user input hardware activity at the microarchitecture level, and store the data on the user device. In such a more particular example, the data can be accessed by a web browser, or requested from a server device in response to a web browser accessing a web site.

In a more particular example, a hardware event detector can be executed on a client device and a hardware event correlator can be executed on a server. The hardware event detector executing on the client device can transmit a report or any other suitable indication indicating whether a hardware event or interrupt has occurred on the client device within a particular period of time. As described above, such a hardware event can be created in response to physically moving a mouse or other pointer device, touching a trackpad or other touch-sensitive device, etc. It should be noted that bot fraud applications do not access the hardware and, as such, hardware events cannot be simulated.

At 306, process 300 can correlate the user input hardware activity data and the website interaction data using any suitable techniques or combination of techniques and any suitable information. For example, in some embodiments, process 300 can determine whether each piece of website interaction data matches a piece of user input hardware activity data. Continuing the above-mentioned example, when a webpage includes code that executes a hardware event detector on a client device, the code on the webpage can generate a mouse trace event and annotate each mouse event with a corresponding output from the hardware event detector. As a more particular example, if one piece of website interaction data indicates that an element of a website was selected at 9:55 PM, and a piece of user input hardware activity data indicates that a computer mouse button was clicked at 9:55 PM, process 300 can determine that such pieces of data match. As another more particular example, if one piece of website interaction data indicates that certain characters were entered into a text field on the website, but no piece of user input hardware activity indicates that the same characters were entered via keystrokes, process 300 can determine that the website interaction data does not have a matching piece of user input hardware activity data. As another example, process 300 can perform a statistical analysis to correlate the user input hardware activity data and the website interaction data. As a more particular example, process 300 can perform a regression analysis to correlate the user input hardware activity data and the website interaction data. As another more particular example, process 300 can determine a correlation coefficient between the user input hardware activity data and the website interaction data.

At 308, process 300 can determine whether the activity on the website is fraudulent based on the correlated user input hardware activity data and website activity data.

In some embodiments, process 300 can determine whether the activity on the website is fraudulent by determining whether the correlated user input hardware activity data and website activity data, as at 306, exceed a threshold value. For example, if the correlation was performed by a regression analysis, process 300 can determine whether the correlation exceeds a threshold $R^2$ value. In such an example, if the $R^2$ value of the regression analysis exceeds a threshold $R^2$ value, process 300 can determine that the activity on the website is not fraudulent. As another example, if process 300 correlated user input hardware activity data and website activity data, as at 306, by matching pieces of website activity data with pieces of user input hardware activity data, process 300 can determine whether the number of matching data pieces exceeds a threshold value. As a more particular example, process 300 can determine a percentage of website activity data pieces that have a matching user input hardware activity data piece, and determine whether the percentage exceeds a threshold percentage.

In some embodiments, process 300 can determine whether the activity on the website is fraudulent based on activity across multiple websites. For example, process 300 can combine the user input hardware activity data and website activity data for the website, with the user input hardware activity data and website activity data for one or more other websites accessed by the same user. In such an example, process 300 can combine the user input hardware activity data and website activity data for each website into the same correlation.

Figure 4A:
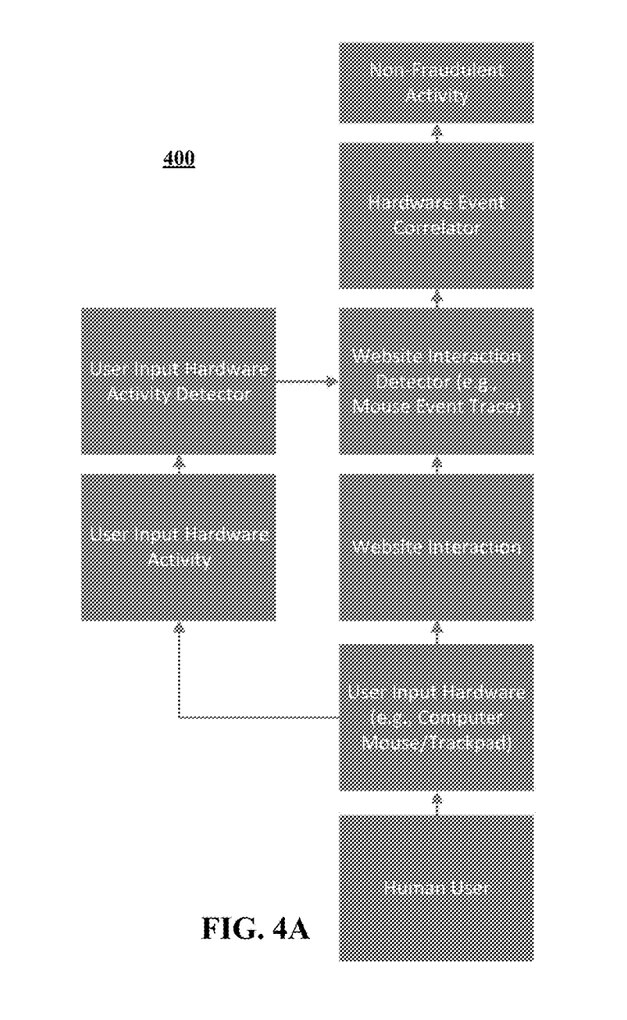

In some embodiments, process 300 can determine whether the activity on the website is fraudulent based on a machine learning technique (e.g., neural networks, decision trees, classification techniques, Bayesian statistics, and/or any other suitable techniques). For example, in some embodiments, process 300 can use historical data related to advertisements previously presented on the website to determine whether the correlated user input hardware activity data and website activity data indicate fraudulent activity. As a more particular example, in some embodiments, process 400 can use information indicating probabilities at which advertisements on the web page have been viewed (e.g., on a particular day of the week, at a particular time of day, and/or relating to any other suitable time frame).

Turning to FIG. 4A, a diagram of an illustrative example of a process 400 for determining whether the activity associated with the website is fraudulent (or not) is shown, where a human user is determined to be engaged in non-fraudulent activity.

As shown in FIG. 4A, when a human user accesses a website, the human user can engage, for example, a computer mouse, trackpad, or any other suitable navigational device. This engagement can result in user input hardware activity, which can then cause website interaction. The user input hardware activity detector and the website interaction detector then can detect the user input hardware activity and website interaction, respectively. Next, the hardware event correlator can then correlate the data from the user input hardware activity detector and the website interaction detector, and because each website interaction should be caused by a respective user input hardware activity, the hardware event correlator should determine a high correlation. As a result, process 400 can determine that the activity is non-fraudulent.

Figure 4B:
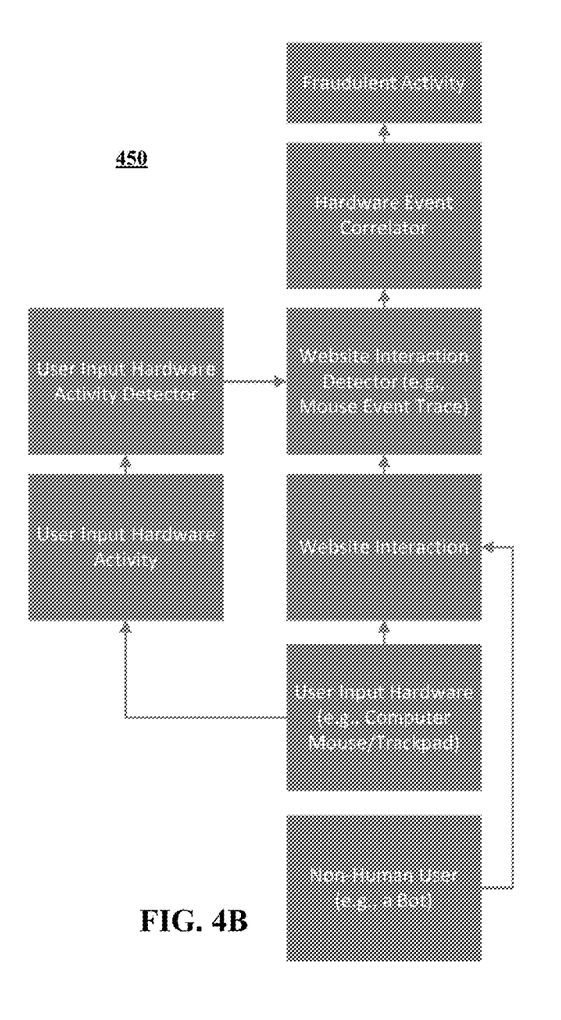

Turning to FIG. 4B, a diagram of an illustrative example of a process 450 for determining whether the activity associated with the website is fraudulent (or not) is shown, where a bot or other application that simulates human user activity is determined to be engaged in fraudulent activity. Unlike in FIG. 4A, when a non-human user accesses a website, website interactions can be simulated even though no user input hardware has been engaged. In such an example, the hardware event correlator will have less user input hardware activity to correlate with website interaction, and the hardware event correlator should determine a low correlation. As a result, process 450 can determine that the activity is fraudulent.

Referring back to FIG. 3, if process 300 determines that the activity on the website is not likely to be fraudulent (e.g., based on information from a hardware event detector executing on a client device), process 300 can continue at 310 by delivering or continuing to deliver advertising content to the website. In some embodiments, process 300 can deliver or continue delivering advertising content to the website by causing an advertiser via an advertisement server to deliver or continue delivering the advertising content. For example, process 300 can deliver information indicating that the activity on the website is not fraudulent to a server associated with an advertiser, and, in response, the advertiser can cause an advertisement server to deliver an advertisement to the website.

Otherwise, if process 300 determines that the activity on the website is likely to be fraudulent, process 300 can take any appropriate action based on the fraudulent activity. For example, process 300 can discontinue delivering advertisements to that website, or discontinue delivering advertisements to that user account or that user device. As a more particular example, process 300 can associate an IP address with fraudulent activity, and discontinue delivering advertisements to that IP address. As another example, process 300 can send information indicating that the activity is fraudulent to a third party. As a more particular example, the third party can be an advertiser, an advertising server, a government body, or any other suitable third party. As another example, process 300 can seek a refund for advertising expenses based on the fraudulent activity.

It should be understood that the mechanisms described herein can, in some embodiments, include server-side software, server-side hardware, client-side software, client-side hardware, or any suitable combination thereof. For example, the mechanisms described herein can encompass a computer program written in a programming language recognizable by server 102 and/or by user device 110 (e.g., a program written in a programming language, such as, Java, C, Objective-C, C++, C#, JavaScript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIG. 3, FIG. 4A, and FIG. 4B can be executed or performed in any order or sequence not limited to the order and sequence shown and described in the figures. Also, some of the above steps of the processes of FIG. 3, FIG. 4A, and FIG. 4B can be executed or performed substantially simultaneously where appropriate or in parallel to reduce latency and processing times. It should also be noted that, as used herein, the term mechanism can encompass hardware, software, firmware, or any suitable combination thereof.

Accordingly, methods, systems, and media for detecting fraudulent activity in connection with advertisements based on hardware events are provided.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for detecting fraudulent activity on a website, the method comprising:
receiving, using a hardware processor, a request for advertising content to be placed on a webpage, wherein the webpage is being presented on a display associated with a user device;
causing, using the hardware processor, code included with the webpage to execute a hardware event detector on the user device that detects a plurality of hardware events that include user hardware activity on the user device being used to interact with the webpage within a particular period of time;
detecting, using the hardware processor, a plurality of website interactions with the webpage, wherein each of the plurality of website interactions is annotated with a corresponding output from the hardware event detector;
correlating, using the hardware processor, each of the plurality of website interactions with the webpage with one or more of the plurality of hardware events detected by the hardware event detector;
determining, using the hardware processor, whether the correlation indicates fraudulent behavior based on a portion of the interactions that do not correlate with the plurality of hardware events; and
responding, using the hardware processor, to the request for advertising content on the webpage by inhibiting the advertising content to be transmitted to the webpage in response to the determination that the correlation indicates fraudulent behavior.

2. The method of claim 1, further comprising generating a tag associated with web content that, when implemented on the user device, stores the plurality of hardware events that include user hardware activity on the user device being used to interact with the webpage and stores the plurality of interactions with the webpage.

3. The method of claim 1, wherein each of the plurality of hardware events is performed by one or more user input hardware devices associated with the user device, wherein the one or more user input hardware devices is a pointer device associated with the user device, wherein the plurality of hardware events includes times at which the pointing device has been moved by a user of the pointing device, and wherein the plurality of interactions with the webpage includes locations corresponding to movement of a cursor across the webpage.

4. The method of claim 1, wherein each of the plurality of hardware events is performed by one or more user input hardware devices associated with the user device, wherein the one or more user input hardware devices is a pointer device associated with the user device, wherein the plurality of hardware events includes relative position or relative movement information of the pointer device, and wherein the plurality of interactions with the webpage includes locations corresponding to movement of a cursor across the webpage.

5. The method of claim 1, wherein each of the plurality of hardware events is performed by one or more user input hardware devices associated with the user device, wherein the one or more user input hardware devices is a keyboard device associated with the user device, wherein the plurality of hardware events includes times at which characters have been selected on the keyboard device and, for each time, an identification of which character was selected, and wherein the plurality of interactions with the webpage includes at least one of entries into text fields on the webpage and characters entered while viewing the webpage.

6. The method of claim 1, wherein each of the plurality of hardware events is performed by one or more user input hardware devices associated with the user device, wherein the plurality of interactions with the webpage is correlated with the plurality of hardware events at one or more user input hardware devices by performing a regression analysis and wherein the at least a portion of the interactions with the webpage are determined to be indicative of fraudulent behavior based on a regression-based threshold value.

7. A system for detecting fraudulent activity on a website, the system comprising:
a memory; and
a hardware processor that, when executing computer-executable instructions stored in the memory, is configured to:
receive a request for advertising content to be placed on a webpage, wherein the webpage is being presented on a display associated with a user device;
cause code included with the webpage to execute a hardware event detector on the user device that detects a plurality of hardware events that include user hardware activity on the user device being used to interact with the webpage within a particular period of time;
detect a plurality of website interactions with the webpage, wherein each of the plurality of website interactions is annotated with a corresponding output from the hardware event detector;

correlate each of the plurality of website interactions with the webpage with one or more of the plurality of hardware events detected by the hardware event detector;

determine whether the correlation indicates fraudulent behavior based on a portion of the interactions that do not correlate with the plurality of hardware events; and respond to the request for advertising content on the webpage by inhibiting the advertising content to be transmitted to the webpage in response to the determination that the correlation indicates fraudulent behavior.

8. The system of claim 7, wherein the hardware processor is further configured to generate a tag associated with web content that, when implemented on the user device, stores the plurality of hardware events that include user hardware activity on the user device being used to interact with the webpage and stores the plurality of interactions with the webpage.

9. The system of claim 7, wherein each of the plurality of hardware events is performed by one or more user input hardware devices associated with the user device, wherein the one or more user input hardware devices is a pointer device associated with the user device, wherein the plurality of hardware events includes times at which the pointing device has been moved by a user of the pointing device, and wherein the plurality of interactions with the webpage includes locations corresponding to movement of a cursor across the webpage.

10. The system of claim 7, wherein each of the plurality of hardware events is performed by one or more user input hardware devices associated with the user device, wherein the one or more user input hardware devices is a pointer device associated with the user device, wherein the plurality of hardware events includes relative position or relative movement information of the pointer device, and wherein the plurality of interactions with the webpage includes locations corresponding to movement of a cursor across the webpage.

11. The system of claim 7, wherein each of the plurality of hardware events is performed by one or more user input hardware devices associated with the user device, wherein the one or more user input hardware devices is a keyboard device associated with the user device, wherein the plurality of hardware events includes times at which characters have been selected on the keyboard device and, for each time, an identification of which character was selected, and wherein the plurality of interactions with the webpage includes at least one of entries into text fields on the webpage and characters entered while viewing the webpage.

12. The system of claim 7, wherein each of the plurality of hardware events is performed by one or more user input hardware devices associated with the user device, wherein the plurality of interactions with the webpage is correlated with the plurality of hardware events at one or more user input hardware devices by performing a regression analysis and wherein the at least a portion of the interactions with the webpage are determined to be indicative of fraudulent behavior based on a regression-based threshold value.

13. A non-transitory computer-readable medium containing computer executable instructions that, when executed by a processor, cause the processor to perform a method for detecting fraudulent activity on a website, the method comprising:

receiving a request for advertising content to be placed on a webpage, wherein the webpage is being presented on a display associated with a user device;

causing code included with the webpage to execute a hardware event detector on the user device that detects a plurality of hardware events that include user hardware activity on the user device being used to interact with the webpage within a particular period of time;

detecting a plurality of website interactions with the webpage, wherein each of the plurality of website interactions is annotated with a corresponding output from the hardware event detector;

correlating each of the plurality of website interactions with the webpage with one or more of the plurality of hardware events detected by the hardware event detector;

determining whether the correlation indicates fraudulent behavior based on a portion of the interactions that do not correlate with the plurality of hardware events; and responding to the request for advertising content on the webpage by inhibiting the advertising content to be transmitted to the webpage in response to the determination that the correlation indicates fraudulent behavior.

14. The non-transitory computer-readable medium of claim 13, further comprising generating a tag associated with web content that, when implemented on the user device, stores the plurality of hardware events that include user hardware activity on the user device being used to interact with the webpage and stores the plurality of interactions with the webpage.

15. The non-transitory computer-readable medium of claim 13, wherein each of the plurality of hardware events is performed by one or more user input hardware devices associated with the user device, wherein the one or more user input hardware devices is a pointer device associated with the user device, wherein the plurality of hardware events includes times at which the pointing device has been moved by a user of the pointing device, and wherein the plurality of interactions with the webpage includes locations corresponding to movement of a cursor across the webpage.

16. The non-transitory computer-readable medium of claim 13, wherein each of the plurality of hardware events is performed by one or more user input hardware devices associated with the user device, wherein the one or more user input hardware devices is a pointer device associated with the user device, wherein the plurality of hardware events includes relative position or relative movement information of the pointer device, and wherein the plurality of interactions with the webpage includes locations corresponding to movement of a cursor across the webpage.

17. The non-transitory computer-readable medium of claim 13, wherein each of the plurality of hardware events is performed by one or more user input hardware devices associated with the user device, wherein the one or more user input hardware devices is a keyboard device associated with the user device, wherein the plurality of hardware events includes times at which characters have been selected on the keyboard device and, for each time, an identification of which character was selected, and wherein the plurality of interactions with the webpage includes at least one of entries into text fields on the webpage and characters entered while viewing the webpage.

18. The non-transitory computer-readable medium of claim 13, wherein each of the plurality of hardware events is performed by one or more user input hardware devices associated with the user device, wherein the plurality of interactions with the webpage is correlated with the plurality of hardware events at one or more user input hardware devices by performing a regression analysis and wherein the at least a portion of the interactions with the webpage are determined to be indicative of fraudulent behavior based on a regression-based threshold value.

* * * * *